United States Patent Office 3,734,932
Patented May 22, 1973

3,734,932
1-OXA-8-OXO-2,6,10,10-TETRAMETHYL-SPIRO-[4,5]-DECA-6-ENE
Yajiro Sakato and Kazuo Ina, both of 4300 Mitsuke, Iwata, Japan; Yukitsune Yamamoto, 479 Higashi-cho, Karasumarunishiiru, Kyoto, Japan; and Harumi Morishita, 149 Owari-cho, Hamamatsu, Japan
No Drawing. Original application Jan. 21, 1969, Ser. No. 792,810. Divided and this application May 3, 1971, Ser. No. 139,815
Claims priority, application Japan, Jan. 26, 1968, 43/4,856
Int. Cl. C07d 5/32
U.S. Cl. 260—347.8                     1 Claim

ABSTRACT OF THE DISCLOSURE

Novel 1-oxa - 8 - oxo-2,6,10,10-tetramethyl-spiro-[4,5]-deca-6-ene; compositions for improving aroma and flavor of black tea which contain the above compound; and black tea containing the above compound.

---

This application is a division of application Ser. No. 792,810 in the name of Yajiro Sakato et al., filed Jan. 21, 1969, now U.S. Pat. 3,645,755.

This invention relates to a novel compound useful as a flavoring to improve the aroma and flavor of black tea.

An object of the invention is to provide a novel compound chemically belonging to a class of spiro compounds having a carbon atom as a spiro atom.

Another object of the invention is to provide a spiro compound useful as a flavoring to improve the aroma and flavor of black tea.

A further object of the invention is to provide a composition for improving the aroma and flavor of black tea.

A still further object is to provide a black tea composition having an improved aroma and flavor.

Still another object of the invention is to provide a process for improving the aroma and flavor of black tea.

The above and other objects and advantages of the present invention will be apparent from the following description.

The spiro compound of the invention which has been newly discovered by the present inventors is 1-oxa-8-oxo-2,6,10,10 - tetramethyl-spiro-[4,5]-deca-6-ene. The above compound, hereinafter referred to as "Compound I," has a molecular formula of $C_{13}H_{20}O_2$ and may be represented by the following structural formula:

[Structure: CH₃ CH₃ gem-dimethyl spiro compound with O and =O groups and CH₃ substituents]

The present Compound I indicated above is a liquid having approximate boiling point of 265 to 270° C. and soluble in various organic solvents, such as lower aliphatic alcohols and ethers. Other physical characteristics of the Compound I are shown below:

(1) Molecular weight: Cald. for $C_{13}H_{20}O_2$: 208. Found: Mass, 208.

(2) Ultraviolet spectrum:

$m\mu$ ($\epsilon = 16,000$)

(3) Infrared spectrum: 1660, 1630, 1380–1390 and 1090 cm.$^{-1}$ (4) Nuclear magnetic resonance spectrum:

$\tau = 9.08$ and 8.90 (each 3 H, gemdimethyl), 8.72 (3 H, —O—$\underset{|}{C}$H—C$\underline{H}_3$), 8.5–7.5, (6 H, 3—C$\underline{H}_2$—), 8.03 (3 H, —CH=C—$\underset{|}{C}\underline{H}_3$), 5.9

(1 H, —O—$\underset{|}{C}\underline{H}$—CH₃), and 4.27 (1 H, —C$\underline{H}$=$\underset{|}{C}$—)

The novel compound I of the invention is advantageously prepared by several methods, using 4-(1,2-hydroxy-2,6,6-trimethyl-cyclohexane-1-yl)-2-butanol as the starting material. In one of the preferred methods, said starting compound is dehydrated and then oxidized to give the desired Compound I. This method is represented as follows:

[Reaction scheme: 4-(1,2-hydroxy-2,6,6-trimethyl-cyclohexane-1-yl)-2-butanol → (Dehydration and oxidation) → Compound I]

The starting 4-(1,2-hydroxy-2,6,6-trimethylcyclohexane-1-yl)-2-butanol, hereinafter referred to as "triol," is a novel compound and is prepared by the hydrogenation and reduction of dihydroxy-2,3-β-ionone as described in detail in the appended Example 1. The dihydroxy-2,3-β-ionone is known to the art, and procedures for preparing this compound from β-ionone is disclosed in Helv. Chim. Acta. 29, 1829 (1946) and ibid. 30, 880 (1947).

In the production of Compound I the dehydration of the triol may be conducted in the presence of dehydrating agents, such as potassium bisulfate, sulfuric acid, phosphorous oxychloride, phosphorus chloride and the like. Preferable reaction conditions may vary in accordance with the kinds of the dehydrating agents used. When, for example, potassium bisulfate which is most desirable agent is employed, the reaction is preferably performed in the molten state of the triol at 120 to 140° C. In the case of using sulfuric acid, phosphorous oxychloride or phosphorous chloride as the dehydrating agent, the reaction is carried out in suitable solvents, such as acetone, benzene, etc. under reflux temperatures. The resultant product thus obtained is an oily substance which is confirmed by gas chromatographic analysis to be a mixture of several substances including 1-oxa-2,6,10,10-tetramethylspiro-[4,5]-deca-6-ene having the formula of

[Structure: spiro compound with CH₃ groups and O]

The oily substance may be subjected to the subsequent oxidation step as it is, though the 1-oxa-2,6,10,10-tetramethyl-spiro-[4,5]-deca-6-ene may be separated on a chromatograph column or by other means. The oily substance may preferably be oxidized in solvents with oxidizing agents, such as t-butyl chromate and the like at room temperatures. After the completion of the oxidation the Compound I is separated from the reaction mixture by extraction and chromatography. The detailed procedures of this method are given in the appended Example 1.

According to another preferred method in which the triol is used as the starting material, the oily substance obtained by the dehydration of the triol as above is brominated, then reacted with a metal hydroxide to substitute bromine atom with hydroxyl group and finally oxidized to produce the desired Compound I. This method is described in detail in the appended Example 2.

The Compound I may also be synthesized by the method shown in the following equations.

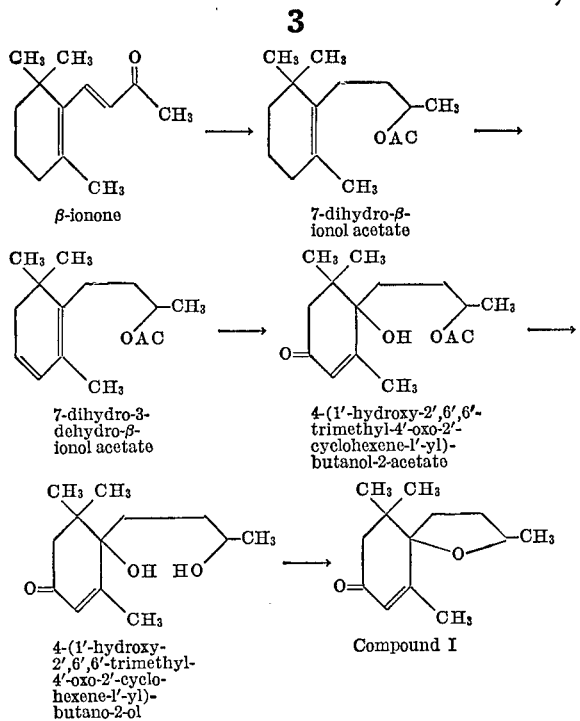

β-ionone 7-dihydro-β-ionol acetate 7-dihydro-3-dehydro-β-ionol acetate 4-(1'-hydroxy-2',6',6'-trimethyl-4'-oxo-2'-cyclohexene-1'-yl)-butanol-2-acetate 4-(1'-hydroxy-2',6',6'-trimethyl-4'-oxo-2'-cyclohexene-1'-yl)-butano-2-ol Compound I 7-dihydro-β-ionol acetate is prepared from β-ionone by hydrogenation, reduction and acetylation, and then is converted to 7-dihydro-3-dehydro-β-ionol acetate by the method of H. B. Henbest (J. Chem. Soc., 1951, 1074). The latter is photooxidized to 4-(1'-hydroxy-2',6',6'-trimethyl - 4' - oxo - 2' - cyclohexene-1'-yl)-butanol-2-acetate by the procedures analogous to those disclosed in Compt. Rend. 1397 (1966). The hydrolysis and subsequent dehydration of the above compound give the desired Compound I.

Further the Compound I may also be synthesized by hydrogenating 1-(1' - hydroxy-2',6',6'-trimethyl-4'-ethylenedioxy - 2' - cyclohexene - 1' - yl)-1-butyn-3-ol in ethyl acetate in the presence of palladium black and dehydrating the resultant product to the desired Compound I, as shown in the following equation:

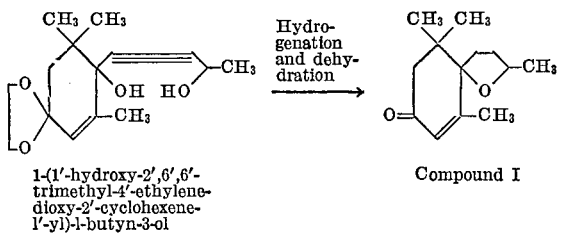

1-(1'-hydroxy-2',6',6'-trimethyl-4'-ethylenedioxy-2'-cyclohexene-1'-yl)-1-butyn-3-ol Compound I In this method the starting 1-(1'-hydroxy-2',6',6'-trimethyl - 4' - ethylenedioxy - 2' - cyclohexene-1'-yl)-1-butyn-3-ol is known to the art and is prepared by condensing 2,6,6 - trimethyl - 4 - ethylenedioxy - 2-cyclohexene-1-one

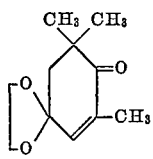

with 1-butyl-3-ol

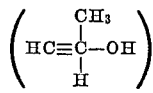

in the presence of lithium amide in liquid ammonia, which is disclosed in Agr. Biol. Chem. 30, 434 (1966) by K. Ohkuma. The production of 2,6,6-trimethyl-4-ethylene-dioxy - 2 - cyclohexene-1-one is also disclosed in U.S. Pat. 2,827,481 (1958).

According to the researches of the present inventors it has been found that when the Compound I of the invention is added to black tea in a small amount the aroma and flavor of the black tea are pronouncedly improved.

Throughout the specification and claims the word "black tea" is intended to include (1) the black tea leaf prepared from the green leaves of the tea tree by withering, rolling, fermentation and firing, which is hereinafter referred to as "black tea leaf" or "tea leaf"; (2) the beverage brewed from black tea leaf, which is hereinafter referred to as "brewed tea"; and (3) the black tea preparations which are prepared by processing the black tea leaf into the desired form, such as, for example, instant black tea.

The Compound I may be added to black tea singly or in mixture with other ingredients having the properties capable of improving the aroma or flavor of black tea. According to the researches of the present inventors it has been found that when the Compound I is used in combination with 2,6,6-trimethyl-2-hydroxy-cyclohexylidene-1-acetic acid lactone more excellent aroma and flavor are given to the resultant black tea as compared with the single use of the respective compounds. The 2,6,6-trimethyl-2-hydroxy-cyclohexylidene - 1 - acetic acid lactone, (M.P. 41° C.), hereinafter referred to as "Compound II," is a known compound having the following structural formula:

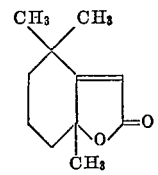

Takeo Sakan et al. synthesized the Compound II and reported that the Compound II is one of the ingredients contained in *Actinidia polygama* (Tetrahedron Letters 17, 1623 (1967)), but no report has been made yet about the aroma and flavor of this compound.

The amount of Compound I or a mixture of Compound I and Compound II to be added to black tea as an effective ingredient may vary in accordance with the grade of black tea leaf, but it is necessary to add such effective ingredient to black tea in an amount sufficient to improve the aroma and flavor derived from the black tea leaf. In general, the effective ingredient is added to black tea in the range of about 0.01 to about 0.50 p.p.m. by weight, most desirable being 0.02 to 0.20 p.p.m. by weight, based on the weight of the black tea leaf. The black tea, e.g. black tea leaf, treated in accordance with the invention may contain the Compound I in excess of the amount above indicated, as such tea leaf may be blended with other tea leaf to produce the desired black tea leaf containing the Compound I within the indicated range. When the Compound I is used in combination with the Compound II, the mixing ratio by weight of Compound I to Compound II is preferably in the range of 3:1 to 1:3, most desirable being 2:1 to 1:2.

For convenience, the description will be made hereinbelow as to the use of Compound I alone, which is the same as the case where a mixture of Compound I and Compound II is used.

The Compound I may be used in the form of various preparations, such as solution, aqueous suspension and powder, containing effective amount of Compound I and at least one of solid or liquid carriers.

The solution is prepared by dissolving Compound I in organic solvents, such as methanol, ethanol, isopropanol, ethyl ether, dioxane, acetone, methylethyl ketone, etc. Of these solvents ethyl alcohol is most desirable. The aqueous suspension is prepared by suspending the concentrated solution prepared as above in water. The powder is prepared by adding solid carriers to the above solution of Compound I to effect the absorption of Compound I into the carriers and grinding into powder, as required. The solid carriers are sustantially non-toxic to human body, tasteless, ordorless, non-hygroscopic and insoluble in the organic solvent of the solution but soluble in water, and include, for example, pentoses, dextrines, etc. Such powder may further be impregnated with a small amount of waxy sustance, preferably with wax of black tea leaf, by previously dissolving the waxy substance in the solution of Compound I to which the solid carriers are added, so as to prevent the rapid loss of the aroma and flavor due to the evaporation of the Compound I.

The concentration of the Compound I in the above preparation may vary over a wide range and is not critical. What is important is that the black tea treated in accordance with the invention contains Compound I in sufficient amounts for improving the aroma and flavor derived from the black tea leaf itself.

The Compound I may be incorporated in various forms of black tea, i.e. black tea leaf, brewed tea or black tea preparations by dipping, spraying or other methods suitable for the forms of black tea and of the Compound I. When the Compound I is added to black tea leaf, it may be applied in the form of solution or aqueous suspension by dipping or spraying.

The Compound I may also be applied by contacting black tea leaf with the vapor of the Compound I so as to impart effective aroma and flavor to the black tea leaf. In such a case it is preferable to coat the inner surface of the container of black tea leaf with a solution or suspension of the Compound I and then to seal the container, or to put the paper coated with the solution or suspension of the Compound I into the container and then to seal the container, whereby the black tea leaf in the container is brought into contact with the vapor of the Compound I which is generated by natural evaporation. When the Compound I is applied to teabags, for example, wrappers for black tea leaf is impregnated with the Compound I by spraying, dipping, printing or otherwise. The amount of the Compound I to be attached to the wrapping material is preferably in the range of 0.003 to 0.030 mg. per square meter of the material. In the preferable method, the solution or aqueous suspension of the Compound I is printed on the inner surface of the wrapping material so as to be attached thereto in the above amount. In order to prevent the rapid loss of the aroma and flavor due to the evaporation of the Compound I, waxy substance, such as wax of tea leaf may be added to the solution or suspension.

Further the Compound I may also be added at any stages of the production of the black tea leaf, such as withering, rolling, fermentation, etc.

To improve the aroma and flavor of instant black tea, the Compound I is preferably used in the form of powder, and the powder is mixed with instant black tea.

For better understanding of the invention examples of the production of Compound I and starting material thereof and of the preparation of black tea composition of the invention are given below:

EXAMPLE 1

(1) Production of the starting triol 40 grams of β-ionone was dissolved in a solution of 41.7 grams of monoperphthalic acid dissolved in 900 milliliters of ethyl ether and the resultant solution was kept at room temperature for three days. Thereafter the reaction mixture was washed with aqueous sodium bicarbonate solution and water to remove unreacted monoperphthalic acid, and after removal of the ether by evaporation the residue was cooled in an ice bath to induce crystal formation. The crude crystal thus obtained was purified by recrystallization from a 1:1 weight ratio mixture of ethyl ether and n-hexane, whereby 31.6 grams of epoxy-2,3-β-ionone (M.P. 47–48° C.) was obtained.

24.0 grams of epoxy-2,3-β-ionone was dissolved in 30 milliliters of ethanol and cooled in an ice bath to 10–15° C. To the cooled solution was added dropwise with stirring 30 milliliters of 20 weight percent sulfuric acid dissolved in 60 milliliters of ethanol, and the mixture was kept at 10 to 15° for two days. Thereafter the reaction mixture was poured into a large amount of water and the oil layer was extracted with ethyl ether. The extract was washed with water and then the ether was driven off to precipitate crystalline solid. The solid was purified by recrystallization from a 1:1 weight ratio mixture of ethyl ether and n-hexane, producing 14.1 grams of dihydroxy-2,3-β-ionone having a melting point of 111° C.

A one-liter flask was charged with a solution of 14 grams of the resultant dihydroxy-2,3-β-ionone dissolved in 700 milliliters of ethanol and to the solution was added 0.15 gram of platinum oxide. The air in the flask was replaced with hydrogen gas which was introduced into the flask until the absorption of the hydrogen ceased.

Removal of the ethanol under reduced pressure gave crystalline solid having a melting point of 116 to 118° C. The resultant solid was dissolved in 70 milliliters of methanol, to which was added with stirring 1.4 grams of sodium borohydride. The stirring was continued for one hour at 10 to 15° C. while being cooled with an ice bath and further for three hours at room temperature. To the resultant mixture was added 14 milliliters of 2 N sulfuric acid and extracted with ethyl ether. Removal of the ether from the extract gave crystalline solid, which was recrystallized from a 1:1 weight ratio mixture of ether and n-hexane, whereby 12 grams of a product having a melting point of 82° C. was obtained. By elementary analysis and infrared spectrum the product was confirmed to be the desired triol, i.e., 4-(1,2-hydroxy-2,6,6-trimethylcyclohexane-1-yl)-2-butanol.

The results of elementary analysis and infrared spectrum were as follows:

Elementary analysis— Calcd. for $C_{13}H_{26}O_3 \cdot H_2O$ (percent): C, 62.90, H, 11.29. Found (percent): C, 62.87, H, 11.39.

Infrared spectrum: 3360, 1460, 1410, 1375 and 1105 cm.$^{-1}$.

(2) Production of Compound I

To 12 grams of the triol obtained as above was added 8 grams of potassium bisulfate and the resultant mixture was heated in an oil bath at 130 to 140° C. for 5 hours. The reaction mixture was poured into a large amount of water and the oil layers was extracted with ethyl ether. The extract was washed with water and dried with sodium sulfate. Removal of the ether gave 9.6 grams of oily substance. By gas chromatographic analysis the oily substance was confirmed to be a mixture of several compounds.

Whole amount (9.6 grams) of the oily substance thus obtained was added to t-butyl chromate solution prepared by dissolving 31 grams of t-butyl alcohol, 21 grams of chromic anhydride, 19 milliliters of acetic acid and 2.9 milliliters of acetic anhydride in 135 milliliters of carbon tetrachloride. The resultant mixture was left standing at room temperature for six days in the dark, and thereafter the reaction mixture was mixed with excess oxalic acid. After separating carbon tetrachloride-water layer the organic layer was successively washed with water, aqueous sodium carbonate solution and water, then dried with sodium sulfate, and carbon tetrachloride was evaporated. The resultant residue was chromatographed, whereby 460 milligrams of a liquid substance was obtained. By ultraviolet spectrum, infrared spectrum, nuclear magnetic resonance spectrum and measurement of molecular weight (mass) this liquid substance was confirmed to be the desired Compound I.

EXAMPLE 2

(Production of Compound I)

In the same manner as in Example 1—(2) 12 grams of triol, i.e., 4-(1,2-hydroxy-2,6,6-trimethylcyclohexane-1-yl)-2-butanol, prepared by the same method as in Example 1—(1) was reacted with potassium bisulfate, whereby 9.6 grams of oily substance same as in Example 1—(2) was obtained.

In 25 milliliters of benzene were dissolved 9.6 grams of the resultant oily substance and 11 grams of N-bromo-succinimide and the solution was refluxed for two hours. After cooling the reaction mixture 10 milliliters of petroleum ether was added thereto to complete the precipitation of succinimide, and the mixture was filtered. The filtrate was thoroughly mixed with excess silver oxide-water at room temperature and further filtered to remove the produced silver bromide. The filtrate was washed with water until the organic layer became neutral, then dried with sodium sulfate and concentrated to vaporize the benzene and petroleum ether.

6.7 grams of the resultant product was dissolved in 50 grams of pyridine and to the solution was added chromic anhydride-pyridine complex prepared by dissolving 15 grams of chromic anhydride in 150 grams of pyridine. The mixture was stirred at room temperature for two hours, after which the reaction mixture was poured into 900 milliliters of water and the oil layer was extracted with two 300 milliliter portions of ethyl ether. The combined ether extracts were washed with three 200-milliliter portions of water, with 200 milliliters of 2 N hydrochloric acid and finally with 200 milliliters of water. After removal of the ether the resultant substance was chromatographed to give 2.4 grams of Compound I.

EXAMPLE 3

Sample solutions were prepared by dissolving Compound I or Compound II or a mixture of Compound I and Compound II in ethanol to a concentration of 0.1 mg. percent. The mixing ratio of Compound I and Compound II is shown in Table 1 below.

The predetermined amounts of the resultant solutions were dropped by a micropipette on the wrappers of two kinds of tea bags "A" and "B" containing 2 grams of tea leaf in the amount shown in Table 1. After removal of the ethanol by evaporation, brewed tea was prepared from the respective tea bags using 150 cc. of boiling water.

The aroma and flavor of the resultant brewed tea were tested by five specialists and were judged in accordance with the following criteria:
5: Most excellent in aroma and flavor
4: Excellent in aroma and flavor
3: Good in aroma and flavor
2: Slightly poor in aroma and flavor
1: Poor in aroma and flavor

EXAMPLE 4

(Improvement of black tea leaf)

100 cc. of a solution of Compound I dissolved in ethanol to a concentration of 25 mg. percent was sprayed uniformly over 50 kilograms of black tea leaf, and after drying at room temperature it was mixed homogeneously. 10 kilograms of the resultant black tea leaf was mixed with 100 kilograms of black tea leaf whose flavour was to be improved.

EXAMPLE 5

(Improvement of black tea leaf in fermentation step)

1000 cc. of solution of the Compound I dissolved in a proportion of 0.1 mg. percent was sprayed thoroughly on 50 kilograms of the black tea leaf just after the fermentation process, and dried by conventional way. The aroma and flavor of thus processed tea leaf were pronouncedly improved.

EXAMPLE 6

(Improvement of black tea leaf)

A 30-mg. percent ethanol solution of Compound I was uniformly sprayed on odorless paper, at the rate of 20 cc./$M^2$. After drying the paper at room temperature, the paper containing the Compound I was cut to 2 x 2 cm. square and 25 pieces of the cut paper were placed in a container together with 50 kilograms of black tea leaf. The container was sealed and left standing for a month. By this process the aromatic constituent contained in the paper was absorbed in black tea leaf, and thus the flavor derived from the paper was preserved until the time of brewing.

EXAMPLE 7

(Improvement of flavour of tea bags)

In 100 cc. of 20 weight percent ethanol were dissolved 0.2 mg. of the Compound I and 0.1 mg. of wax of tea leaf. The solution was applied in a continuous narrow line on a rolled paper of 10 cm. in width with a glass pen holding the above solution, so as to apply 0.1 cc. of the solution per 15 cm. length of the paper. Thus treated paper was cut into desired size and 2 grams of black tea leaf was wrapped in the paper to prepare tea bags.

EXAMPLE 8

(Improvement of flavour of instant black tea)

0.2 mg. of a 2:1 weight ratio mixture of the Compound I and Company II was added to a solution of 0.1 mg. of wax of tea leaf dissolved in 100 cc. of ethyl alcohol, to which was further added 100 grams of xylose, and the ethanol was vaporized by stirring the mixture at room temperature, and the residue was dried on calcium chloride.

TABLE 1

| No. | Black tea leaf | Sample soln. (wt. ratio) Comp. I | Sample soln. (wt. ratio) Comp. II | Amount to tea bags (cc.) | Amount to tea leaf (p.p.m.) | Inspector I | II | III | IV | V | Total |
|---|---|---|---|---|---|---|---|---|---|---|---|
| 1 | A | | | 0 | 0 | 4 | 3 | 3 | 2 | 2 | 14 |
| 2 | A | 1 | 0 | 0.1 | 0.05 | 3 | 3 | 3 | 4 | 4 | 17 |
| 3 | A | 1 | 0 | 0.2 | 0.10 | 3 | 4 | 4 | 4 | 5 | 20 |
| 4 | A | 0 | 1 | 0.1 | 0.05 | 3 | 4 | 3 | 3 | 3 | 16 |
| 5 | A | 0 | 1 | 0.2 | 0.10 | 4 | 4 | 3 | 4 | 4 | 19 |
| 6 | A | 1 | 1 | 0.1 | 0.05 | 4 | 4 | 4 | 4 | 4 | 20 |
| 7 | A | 1 | 1 | 0.2 | 0.10 | 5 | 5 | 4 | 5 | 4 | 23 |
| 8 | A | 1 | 2 | 0.1 | 0.05 | 4 | 5 | 4 | 5 | 4 | 22 |
| 9 | A | 2 | 1 | 0.2 | 0.10 | 5 | 4 | 5 | 5 | 5 | 24 |
| 10 | B | | | 0 | 0 | 3 | 2 | 3 | 3 | 2 | 13 |
| 11 | B | 1 | 0 | 0.12 | 0.06 | 4 | 3 | 4 | 3 | 3 | 17 |
| 12 | B | 1 | 0 | 0.24 | 0.12 | 4 | 4 | 4 | 4 | 3 | 19 |
| 13 | B | 0 | 1 | 0.12 | 0.06 | 5 | 4 | 4 | 4 | 3 | 20 |
| 14 | B | 0 | 1 | 0.24 | 0.12 | 5 | 5 | 4 | 4 | 4 | 22 |
| 15 | B | 1 | 1 | 0.12 | 0.06 | 4 | 4 | 5 | 5 | 4 | 22 |
| 16 | B | 1 | 1 | 0.24 | 0.12 | 5 | 4 | 5 | 5 | 5 | 24 |
| 17 | B | 1 | 2 | 0.24 | 0.12 | 5 | 5 | 5 | 4 | 5 | 24 |
| 18 | B | 2 | 1 | 0.24 | 0.12 | 5 | 5 | 5 | 5 | 5 | 25 |

9

The xylose to which the above mixture of Compound I and Compound II were absorbed was pulverized in a mortar. 10 grams of thus pulverized powder was thoroughly mixed with 50 grams of instant black tea ("Lipton," trademark) and 0.6 gram of the resultant instant tea was dissolved in 150 cc. of hot water, whereby the aroma and flavor of the tea were improved.

EXAMPLE 9

(Improvement of brewed tea)

0.1 cc. of a solution of the Compound I dissolved in ethyl alcohol to a concentration of 0.1 mg. percent was dropped in a cup of brewed tea prepared by infusing 2 grams of ordinary black tea leaf in 150 cc. of hot water, whereby the aroma and flavor were remarkably improved.

What we claim is:

1. 1 - oxa - 8 - oxo-2,6,10,10-tetramethyl-spiro-[4,5]-deca-6-ene having the structural formula of

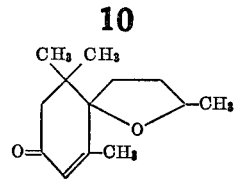

References Cited

UNITED STATES PATENTS 3,645,755   2/1972   Sakato et al. _____ 2650—347.8

ALEX MAZEL, Primary Examiner

B. DENTZ, Assistant Examiner

U.S. Cl. X.R.

260—631 H